US010267233B2

(12) United States Patent
Mastro (10) Patent No.: US 10,267,233 B2
(45) Date of Patent: Apr. 23, 2019

(54) METHOD AND APPARATUS FOR MONITORING LUBRICATION PUMP OPERATION DURING WINDMILLING

(71) Applicant: UNITED TECHNOLOGIES CORPORATION, Hartford, CT (US)

(72) Inventor: Jacob Peter Mastro, Glastonbury, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 763 days.

(21) Appl. No.: 14/920,985

(22) Filed: Oct. 23, 2015

(65) Prior Publication Data

US 2017/0114662 A1    Apr. 27, 2017

(51) Int. Cl.
*F02C 7/06*    (2006.01)
*F01D 25/20*    (2006.01)
*F01D 21/00*    (2006.01)
*F02C 3/107*    (2006.01)

(52) U.S. Cl.
CPC .............. *F02C 7/06* (2013.01); *F01D 21/003* (2013.01); *F01D 25/20* (2013.01); *F02C 3/107* (2013.01); *F05D 2260/40311* (2013.01); *F05D 2260/98* (2013.01); *F05D 2270/304* (2013.01)

(58) Field of Classification Search
CPC ...... F02C 7/06; F02C 7/32; F02C 7/36; F02C 3/107; F01D 21/003; F01D 25/18; F01D 25/20; F02K 3/06; F05D 2260/40311; F05D 2260/98; F05D 2270/304
USPC ........................................................ 60/39.08
See application file for complete search history.

(56) References Cited

U.S. PATENT DOCUMENTS

| 2,475,219 | A |   | 7/1949 | Cartwright |
| 3,287,906 | A |   | 11/1966 | McCormick |
| 3,742,702 | A | * | 7/1973 | Quinn .................... F02C 7/08 60/39.23 |

(Continued)

FOREIGN PATENT DOCUMENTS

| GB | 1516041 | 6/1978 |
| GB | 2041090 | 9/1980 |
| WO | 2007038674 | 4/2007 |

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

(Continued)

*Primary Examiner* — Phutthiwat Wongwian
*Assistant Examiner* — Loren C Edwards
(74) *Attorney, Agent, or Firm* — Carlson, Gaskey & Olds, P.C.

(57) ABSTRACT

According to one aspect of the present disclosure, a lubrication monitoring system is disclosed that includes a fan, a gear reduction operatively coupled to the fan, and a lubrication pump that is operatively coupled to the fan and is in fluid communication with the gear reduction. A first sensor is configured to detect a windmilling condition of the fan, and a second sensor is configured to detect an operational state of the lubrication pump. A controller in communication with the first and second sensors is configured to monitor the windmilling condition and the operational state of the lubrication pump, and command a status indicator in response thereto.

12 Claims, 9 Drawing Sheets

(56) References Cited

U.S. PATENT DOCUMENTS

| | | | |
|---|---|---|---|
| 3,754,484 | A | 8/1973 | Roberts |
| 3,892,358 | A | 7/1975 | Gisslen |
| 4,130,872 | A | 12/1978 | Harloff |
| 4,354,183 | A | 10/1982 | Weeks et al. |
| 5,018,491 | A | 5/1991 | Fish |
| 5,056,017 | A | 10/1991 | McGarvey |
| 5,180,034 | A * | 1/1993 | Lopes ................ F16N 7/40 184/6.1 |
| 5,433,674 | A | 7/1995 | Sheridan et al. |
| 5,447,411 | A | 9/1995 | Curley et al. |
| 5,524,847 | A | 6/1996 | Brodell et al. |
| 5,623,416 | A | 4/1997 | Hocker, III |
| 5,769,182 | A | 6/1998 | Parenteau |
| 5,778,659 | A | 7/1998 | Duesler et al. |
| 5,857,836 | A | 1/1999 | Stickler et al. |
| 5,915,917 | A | 6/1999 | Eveker et al. |
| 5,975,841 | A | 11/1999 | Lindemuth et al. |
| 6,223,616 | B1 | 5/2001 | Sheridan |
| 6,318,070 | B1 | 11/2001 | Rey et al. |
| 6,814,541 | B2 | 11/2004 | Evans et al. |
| 7,021,042 | B2 | 4/2006 | Law |
| 7,174,997 | B2 | 2/2007 | Sheridan |
| 7,591,754 | B2 | 9/2009 | Duong et al. |
| 7,824,305 | B2 | 11/2010 | Duong et al. |
| 7,926,260 | B2 | 4/2011 | Sheridan et al. |
| 8,020,665 | B2 | 9/2011 | Sheridan et al. |
| 8,205,432 | B2 | 6/2012 | Sheridan |
| 8,215,454 | B2 | 7/2012 | Portlock et al. |
| 8,978,829 | B2 | 3/2015 | McCune et al. |
| 2009/0074568 | A1* | 3/2009 | Suciu .............. F01D 17/162 415/145 |
| 2010/0023169 | A1* | 1/2010 | Delaloye ............. F01D 25/20 700/282 |
| 2010/0148396 | A1 | 6/2010 | Xie et al. |
| 2010/0294597 | A1* | 11/2010 | Parnin .............. F01D 25/18 184/6.1 |
| 2010/0331139 | A1 | 12/2010 | McCune |
| 2011/0108360 | A1 | 5/2011 | DiBenedetto |
| 2011/0303491 | A1 | 12/2011 | Jenkins |

OTHER PUBLICATIONS

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

(56) References Cited

OTHER PUBLICATIONS

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. And Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

* cited by examiner

METHOD AND APPARATUS FOR MONITORING LUBRICATION PUMP OPERATION DURING WINDMILLING

BACKGROUND

This disclosure relates to lubrication, and more particularly a method and apparatus for monitoring journal bearing lubrication.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds. Such gear assemblies may include journal bearings.

Air moving through a non-operating gas turbine engine may rotate a fan of the fan section of the gas turbine engine, which causes rotation in the gear assembly. This is known as "windmilling" and it can occur due to either headwinds or tailwinds. If the gas turbine engine is shut down and parked on the ground when windmilling occurs, that is known as "ground windmilling." Even though the engine is not operating during windmilling, rotation of the gear assembly requires lubricant. Journal bearings are particularly sensitive to lubrication deprivation. Thus, an auxiliary lubrication pump has been utilized that is driven by rotation of the fan. Through this arrangement, rotation of the fan drives the auxiliary lubrication pump to provide lubrication during windmilling, even when the engine is shut down.

During normal engine operation, a main lubrication pump is rotationally driven by a high speed spool, supplying lubricant to the gear assembly. During windmilling, the high speed spool is not rotationally driven. The auxiliary lubrication pump is driven whenever the fan is rotationally driven (e.g., during windmilling). In one example, the auxiliary lubrication pump is located in close proximity to the fan, and is driven by a fan shaft.

SUMMARY

One example embodiment of a lubrication monitoring system includes a fan, a gear reduction operatively coupled to the fan, and a lubrication pump operatively coupled to the fan and in fluid communication with the gear reduction. A first sensor is configured to detect a windmilling condition of the fan, and a second sensor is configured to detect an operational state of the lubrication pump. A controller is in communication with the first and second sensors and is configured to monitor the windmilling condition and the operational state of the lubrication pump, and command a status indicator in response thereto.

In another example embodiment of the above described lubrication monitoring system, to detect the windmilling condition of the fan, the first sensor is configured to detect rotation of a first component that corotates with the fan. Also, to detect the operational state of the lubrication pump, the second sensor is configured to detect rotation of a second component that corotates with the fan during operation of the lubrication pump.

In another example embodiment of any of the above described lubrication monitoring systems, the first component is part of the gear reduction.

In another example embodiment of any of the above described lubrication monitoring systems, the first component is a journal bearing.

In another example embodiment of any of the above described lubrication monitoring systems, the controller is configured to calculate a predicted quantity of rotations of the second component based on a determined quantity of rotations of the first component and a ratio that represents a relationship between rotation of the first and second components. The controller is further configured to determine that the lubrication pump did not operate for at least a portion of the windmilling condition if the predicted quantity of rotations of the second component does not match an actual quantity of rotations of the second component during the windmilling condition, within a margin of error.

In another example embodiment of any of the above described lubrication monitoring systems, at least one of the first and second sensors comprises a proximity probe configured to detect rotation.

In another example embodiment of any of the above described lubrication monitoring systems, at least one of the first and second switching devices is actuated by a cam that corotates with its associated component.

In another example embodiment of any of the above described lubrication monitoring systems, the controller is configured to determine whether the lubrication pump operated during the windmilling condition based on the windmilling condition and the operational state of the lubrication pump. The status indicator indicates whether the lubrication pump operated during the windmilling condition.

In another example embodiment of any of the above described lubrication monitoring systems, the lubrication pump is mechanically coupled to the gear reduction, and rotation of a fan shaft drives operation of the lubrication pump.

In another example embodiment of any of the above described lubrication monitoring systems, the controller includes a battery-operated recording device configured to record data from the first and second sensors; and a computing device that is discrete from but operatively connected to the recording device. The computing device is configured to download the data from the recording device; and determine whether the lubrication pump operated during the windmilling condition based on the windmilling condition and the operational state of the lubrication pump indicated by the data.

In another example embodiment of any of the above described lubrication monitoring systems, the computing device comprises one of a Full Authority Digital Electronic Control (FADEC) and an Electronic Centralized Aircraft Monitor (ECAM).

In another example embodiment of any of the above described lubrication monitoring systems, the computing device is non-powered during the windmilling condition, and the computing device is configured to charge the battery of the recording device when the computing device is powered.

In another example embodiment of any of the above described lubrication monitoring systems, the lubrication monitoring system is part of a gas turbine engine, and the lubrication pump is an auxiliary lubrication pump that is configured as a backup for a main lubrication pump.

An example method is disclosed which includes detecting a windmilling condition; detecting a lubrication pump operational state during the windmilling condition; and commanding a status indicator in response to the windmilling condition and lubrication pump operation state detecting steps.

In another example embodiment of the above described method, detecting the windmilling condition comprises detecting rotation of a first component that corotates with a fan; and detecting the lubrication pump operational state comprises detecting rotation of a second component that corotates with the fan during operation of the lubrication pump.

In another example embodiment of any of the above described methods, the method includes calculating a predicted quantity of rotations of the second component based on a determined quantity of rotations of the first component during the windmilling condition and a ratio that represents a relationship between rotation of the first and second components. In this example embodiment, the method also includes determining that the lubrication pump did not operate for at least a portion of the windmilling condition if the predicted quantity of rotations of the second component does not match an actual quantity of rotations of the second component during the windmilling condition, within a margin of error.

One example embodiment of a gas turbine engine includes a turbine operatively connected to a fan rotor through a gear reduction, and a lubrication pump operatively coupled to the fan rotor and in fluid communication with the gear reduction. A first sensor is configured to detect a windmilling condition of the fan rotor, and a second sensor is configured to detect an operational state of the lubrication pump. A controller is in communication with the first and second sensors and is configured to monitor the windmilling condition and the operational state of the lubrication pump, and command a status indicator in response thereto.

In another example embodiment of the above described gas turbine engine, the lubrication pump is an auxiliary lubrication pump, and the gas turbine engine includes a main lubrication pump that is rotationally driven by a high speed spool which does not rotate with the fan rotor.

In another example embodiment of any of the above described gas turbine engines, to detect the windmilling condition of the fan, the first sensor is configured to detect rotation of a first component that corotates with the fan; and to detect the operational state of the lubrication pump, the second sensor is configured to detect rotation of a second component that rotates during operation of the lubrication pump.

The embodiments described above and herein may be taken independently or in any combination. Features described in connection with one embodiment are applicable to all embodiments, unless such features are incompatible. The features described above, and other features, may be best understood from the following drawings and specification.

DETAILED DESCRIPTION

According to one aspect of the present disclosure, a method and related apparatus are disclosed for detecting whether an auxiliary lubrication pump operates during a windmilling condition that occurs when a gas turbine engine and its engine controller are both turned off. This can be achieved using a recording device that records data indicative of a number of rotations of a first component (e.g., a first gear), and data indicative of a number of rotations of a second component (e.g., a second gear) that rotates during operation of the auxiliary lubrication pump. When the engine controller turns on, this data can be downloaded from the recording device, and based on a ratio that indicates a relationship between rotation of the first and second components, a determination can be made of whether windmilling occurred without corresponding operation of the auxiliary lubrication pump.

This allows for monitoring of an auxiliary oil system during times when a gas turbine engine is not operational and an engine controller is off. For example, if the health of the auxiliary oil system is checked at every start and shutdown of the engine, one can reasonably assume that because the auxiliary lubrication pump has a positive displacement, the journal bearing received lubricant.

In one or more embodiments, the first component is part of a geared architecture of a gas turbine engine (e.g., a journal bearing in the geared architecture, or a component that rotates about a journal bearing in the geared architecture). In the same or other embodiments, the ratio is a gear ratio that indicates a gear reduction provided by the geared architecture. The ratio could be X:Y, such that X and Y both equal 1, such that X>Y, or such that X<Y, for example.

Figure 1:
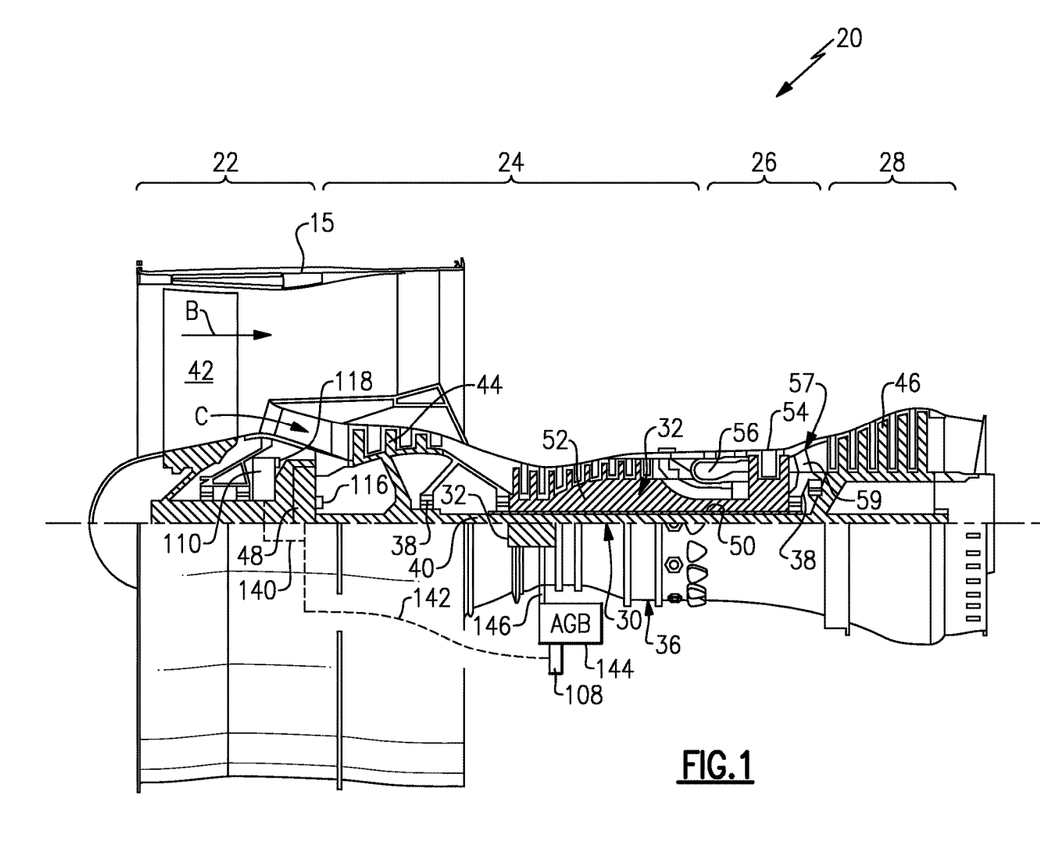
FIG. 1 schematically illustrates a gas turbine engine.

FIG. 1 schematically illustrates an example gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In the same or other embodiments, the geared architecture 48 is an epicyclic gear train, such as a star or a planetary gear system or other gear system having a gear reduction ratio.

The gas turbine engine 20 includes a main lubrication pump 108 and an auxiliary lubrication pump 110 which are in fluid communication with the geared architecture 48 via lubricant conduits 140, 142. In the example of FIG. 1, the main lubrication pump 108 is rotationally driven by an auxiliary gearbox 144, which is mechanically coupled to high speed spool 32 via a shaft 146. Operation of the lubrication pumps 108, 110 will be discussed in more detail below.

Figure 2A:
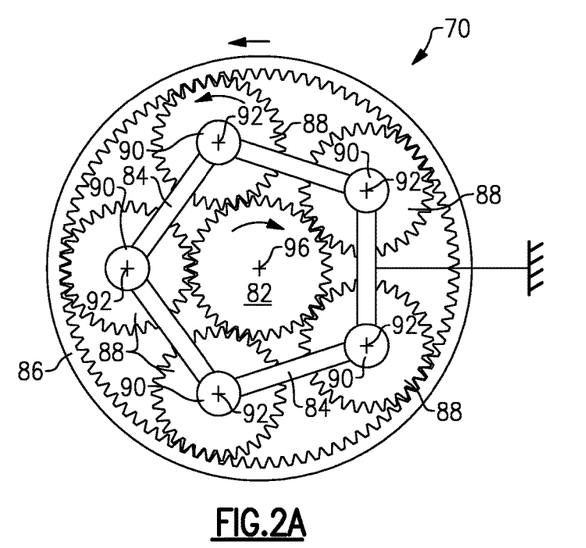
FIG. 2A schematically illustrates an example epicyclic gear train that may be used in the gas turbine engine of FIG. 1.

FIG. 2A schematically illustrates a view of an example epicyclic gear train 70 that may be used as part of the geared architecture 48. The gear train 70 includes a sun gear 82, a ring gear 86 radially outboard of the sun gear 82, and a set of intermediate gears 88 radially intermediate and meshing with the sun gear 82 and ring gear 86. Each intermediate gear 88 rotates about a respective axis 92 of its associated journal pin 90. In one or more embodiments, the axes 92 are parallel with each other and with the axis A of FIG. 1, but are non-coaxial with the axis A of FIG. 1.

Figure 2B:
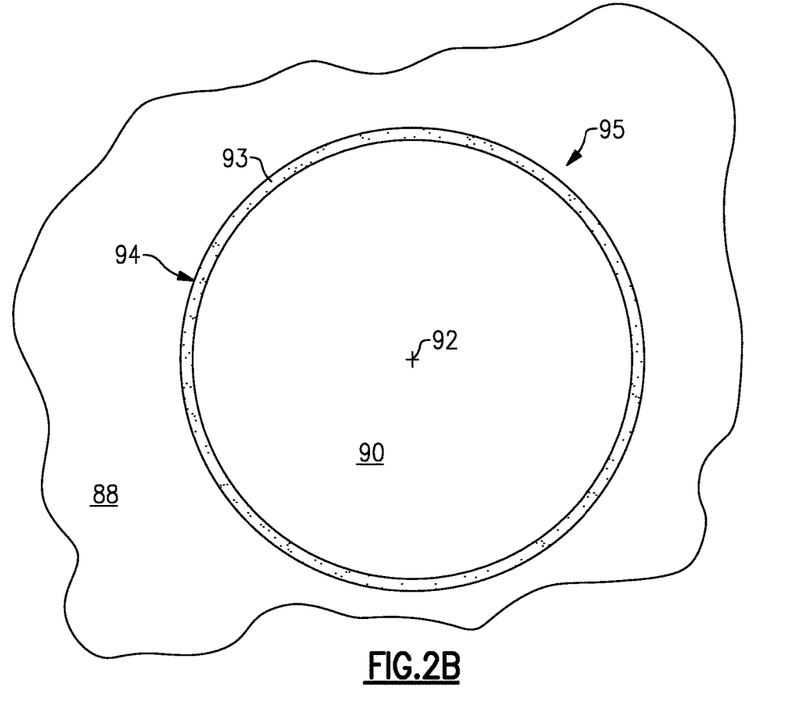
FIGS. 2B-C schematically illustrate a journal bearing of the gear train of FIG. 2.

A thin film of lubricant 93 occupies a small annular space 94 between each intermediate gear 88 and its journal pin 90 to support rotation of the intermediate gear 88 about the journal pin 90 as a journal bearing. An example journal bearing 95 is shown in FIG. 2B. The journal pins 90 are located within the intermediate gears 88 and extend between opposing sides of a carrier 84. The journal pin 90 is fixed from rotation relative to the carrier 84 in the example of FIG. 2B.

Figure 2C:
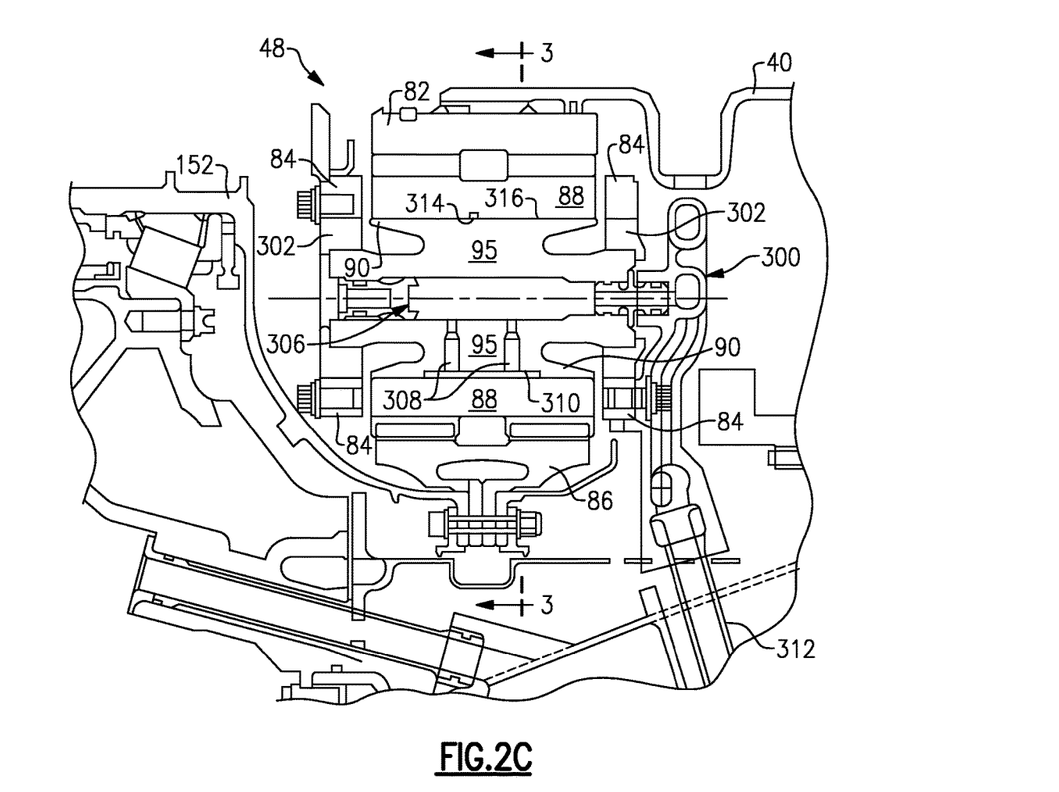
Figure 4:
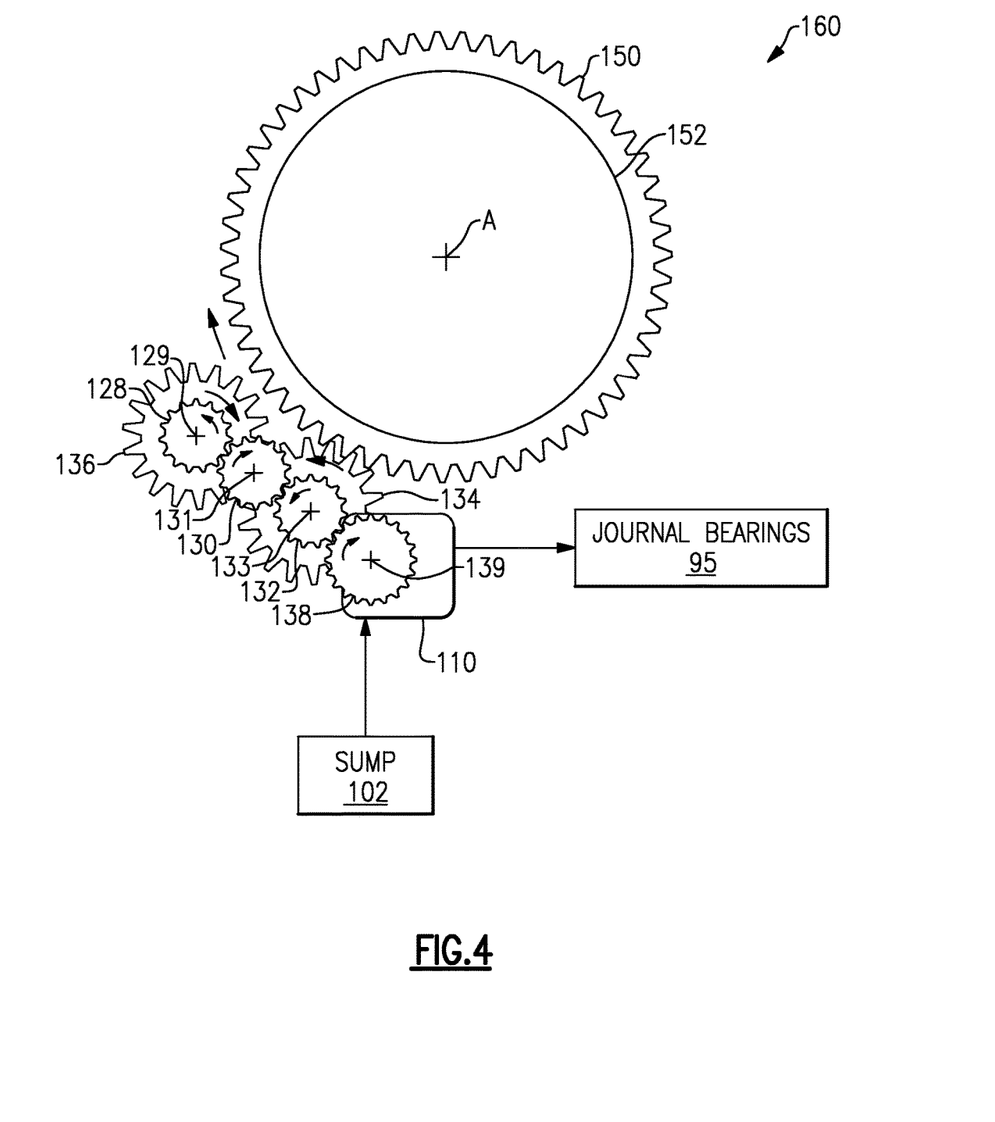
FIG. 4 schematically illustrates an example gear configuration for an auxiliary lubrication pump of the lubrication system of FIG. 3.
Figure 5:
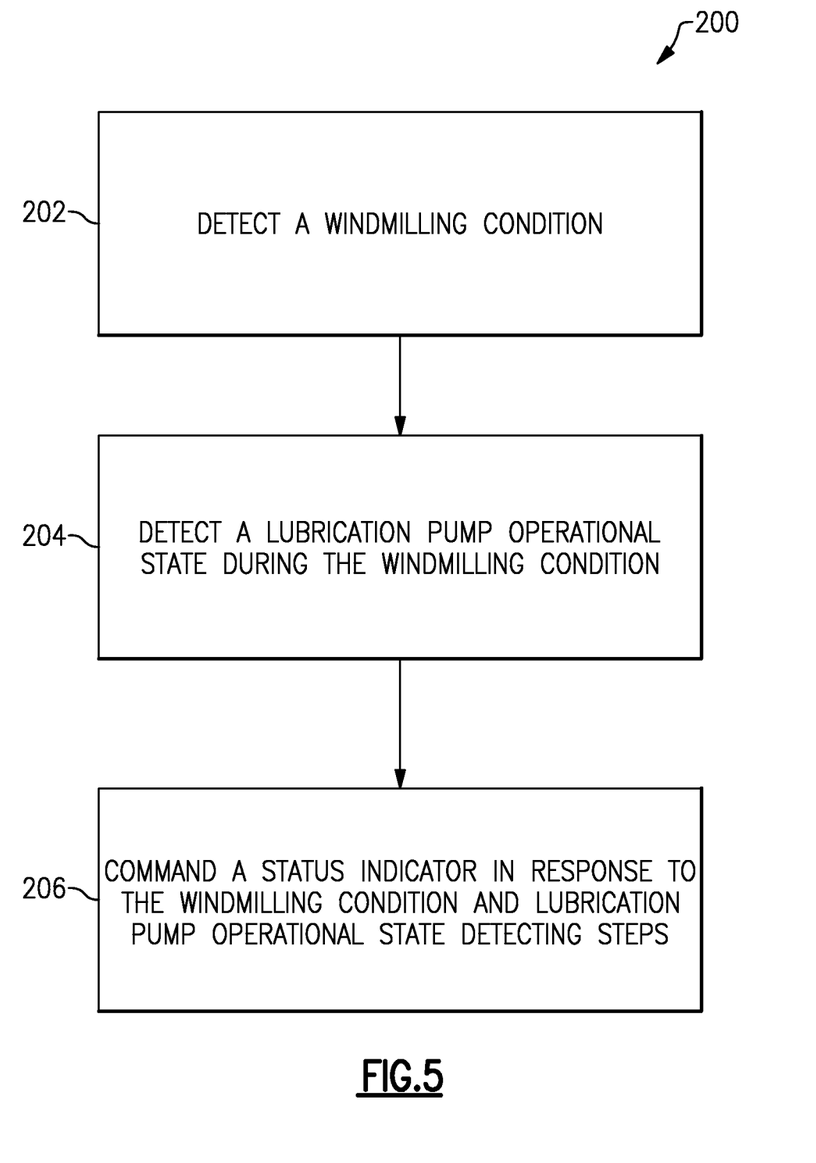
FIG. 5 is a flowchart of an example method.

FIG. 2C illustrates an example schematic cross-sectional view of the epicyclic gear train 70 of FIG. 2 (whereas FIG. 2B is a view of the gear train 70 taken along line 3-3 of FIG. 2B). FIG. 2C is a cross-sectional view of the epicyclic gear train 70 taken through only a single intermediate gear 88. Epicyclic gear train 70, however, includes multiple intermediate gears 88 arranged circumferentially around the sun gear 82 as shown in FIGS. 4 and 5. In addition to intermediate gear 88, ring gear 86, and sun gear 82, epicyclic gear train 70 includes the journal pin 90, lubricant manifold 300, the carrier 84, and end caps 302. Gear carrier 84 is stationarily mounted within gas turbine engine 20 to the non-rotating engine case walls radially outboard of epicyclic gear train 70. Gear carrier 84 has two generally interfacing faces that support the ends of the stationary journal bearing 95. The carrier 84 is disposed adjacent the rotatable intermediate gear 88 and sun gear 82. The sun gear 82 is rotatably mounted on the low pressure shaft 40. Journal pin 90 includes axial passage 306 and radial passages 308. Radial passages 308 fluidly connect to the distribution recess 310. Lubricant manifold 300 is connected to feed tube 312.

A lubricant manifold 300 is disposed adjacent to journal bearing 95 and is fluidly connected thereto. Axial passage 306 is fluidly connected to lubricant manifold 300. Lubricant manifold 300 is fed pressurized liquid lubricant (typically oil) from other components of the gas turbine engine via feed tube 312. The liquid lubricant from lubricant manifold 300 is supplied through axial passage 306 to radial passages 308. The lubricant flows through radial passages 308 into the distribution recess 310 between the journal pin 90 and the intermediate gear 88. The distribution recess 310 may extend along the outer radial surface (i.e., interface surface 314) of journal pin 90. The liquid lubricant forms a film of lubrication (a "lubrication film") on the journal pin 90 in the distribution recess 310. From distribution recess 310, the lubricant film spreads circumferentially and axially due to viscous forces between intermediate gear 88 and journal pin 90. The lubricant film helps to support intermediate gear 88 and reduce friction between inner surface 316 of intermediate gear 88 and interface surface 314 of the journal pin as the intermediate gear 88 rotates.

End caps 302 are welded or otherwise affixed to journal bearing 95 and press fit into carrier 84. End caps 302 and carrier 84 provide support for journal bearing 95. Fasteners extend through end caps 302 and connect to carrier 84 to act as an anti-rotation feature to keep journal pin 90 and journal bearing 95 stationary (i.e., static).

The example of FIGS. 2A and 2C depict a star system in which the sun gear 82 and ring gear 86 are each rotatable about an axis 96 in opposing directions, but the carrier 84 is non-rotatable. Of course, it is understood that this is only an example, and that the teachings discussed herein could be applied to a planetary system in which the carrier 84 rotates (e.g., in a same direction as the sun gear 82), but the ring gear 86 is non-rotatable.

Figure 3:
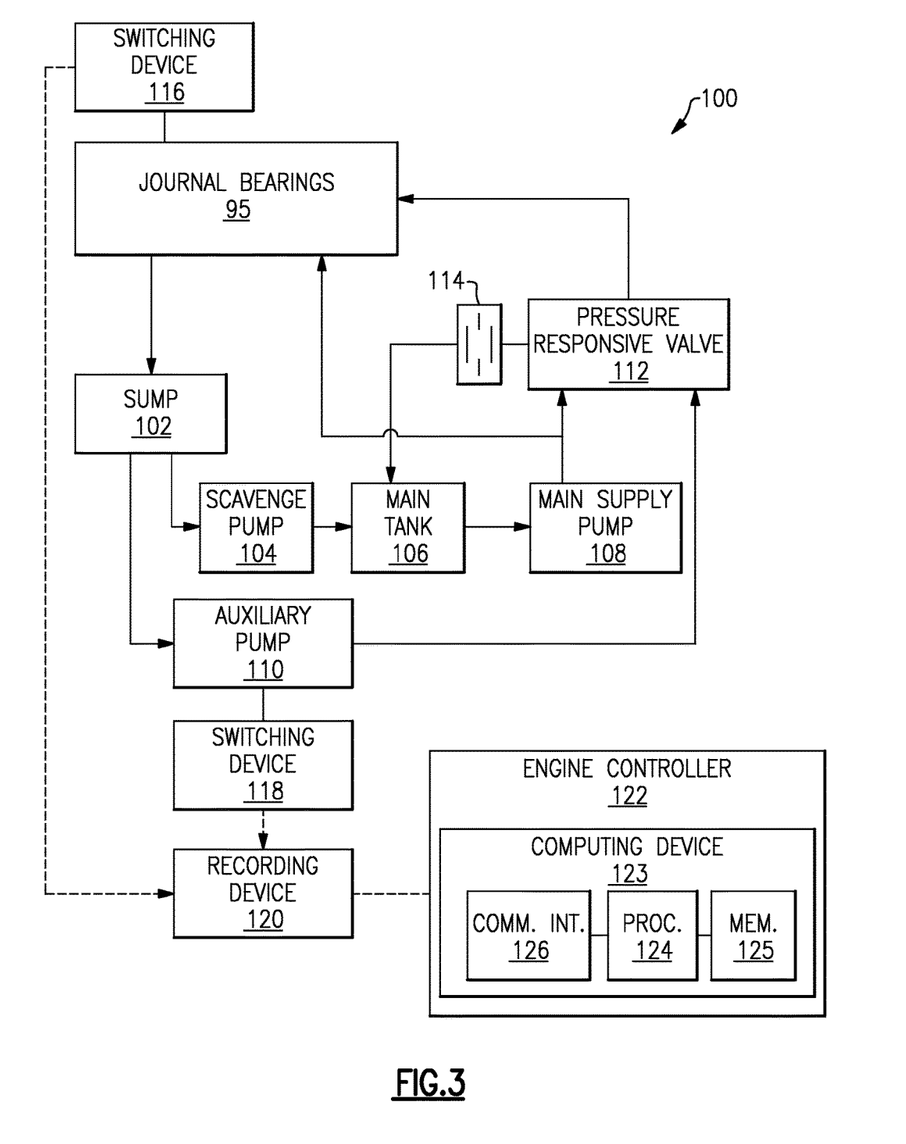
FIG. 3 schematically illustrates a lubrication system for a gas turbine engine.

Lubricant flows through the gear train 70 and also to the journal bearings 95 and to various gears in the gear train 70 which lubricates and cool their teeth. It is desirable to maintain the film of lubricant 93 of journal bearing 95 at a certain thickness when rotation of the gear 88 about the journal pin 90 exceeds a certain speed threshold. FIG. 3 schematically illustrates an example lubrication system 100 that ensures adequate lubrication.

Referring now to FIG. 3, the lubrication system 100 includes a main system whose components include a sump 102, a scavenge pump 104 for scavenging lubricant from the sump 102, a main tank 106 for receiving lubricant from the scavenge pump 104, and a main lubrication supply pump 108 for pumping lubricant from the main tank 106. The lubrication system 100 also includes an auxiliary system whose components include an auxiliary lubrication pump 110 that is configured to pump lubricant from the sump 102. The lubrication system also includes a pressure responsive valve 112 and a restriction orifice 114 that connect the main lubrication pump 108 and auxiliary lubrication pump back 110 to the main tank 106.

The main lubrication supply pump 108 is designed to be a primary source of lubrication when the gas turbine engine 20 is operating. In some examples, the main lubrication supply pump 108 operates when high speed spool 32 rotates, and the auxiliary lubrication pump 110 operates when the low speed spool 30 rotates. If the gas turbine engine 20 is off but the fan 42 is windmilling, the auxiliary lubrication pump 110 still provides lubricant to the journal bearings 95 (shown in FIG. 3) because the low speed spool 30 rotates during windmilling. The auxiliary lubrication pump 110 may also serve as a backup to the main lubrication pump 108 for lubricating the journal bearings 95 when the gas turbine engine 20 is operating.

FIG. 4 schematically illustrates an auxiliary lubrication pump system 160 that drives operation of the auxiliary lubrication pump 110. The system 160 includes a plurality of gears 128, 130, 132, 134, and 136. Gears 128 and 136 corotate about axis 129, gears 132 and 134 corotate about axis 133, and gear 130 rotates about axis 131. Gears 128, 136 are able to rotate in opposing directions about axis 129 because the gears 128, 136 rotate using independent shafts (one inner and one outer) that are concentric and that each extend along a longitudinal axis that is collinear with axis 129. A fan gear 150 rotates with its associated fan shaft 152 about the central longitudinal axis A. Rotation of the fan shaft 152 causes gears 134, 136 to rotate. Because these gears corotate with gears 128, 132, respectively, rotation of the fan shaft 152 also causes gears 128, 130, and 132 to rotate, which rotates gear 138 (about axis 139) to drive operation of the auxiliary lubrication pump 110. Although the discussion below focuses on monitoring rotation of the gear 132 to determine whether the auxiliary lubrication pump 110 is operating, it is understood that any of the gears 128, 130, 134, 136, 138 could be monitored. Also, it is understood this is only an example gear configuration, and that other gear configurations would be possible for the auxiliary lubrication pump 110. In one or more embodiments, the gears of the system 160 can rotate in either direction (e.g., depending on whether windmilling occurs from a headwind or tailwind). Thus, rotation of the gears 128, 130, 132, 134, 136 may be reversible in some embodiments. In the example of FIG. 4, engine central longitudinal axis A is parallel to but non-coaxial with axes 129, 131, 133, 139.

A switching device 116 is configured to transmit a signal to a recording device 120 when its associated gear 88 rotates about journal bearing 95. A switching device 118 is similarly configured to transmit a signal to recording device 120 when its associated gear 132 rotates about axis 133. A computing device 123 is in communication with the recording device 120, and is configured to download recorded data from the recording device 120 that indicates the number of rotations of gears 88, 132 due to windmilling during a monitoring period when the gas turbine engine 20 and the computing device 123 are turned off. Based on this, and a gear ratio, the computing device 123 can determine whether the journal bearings 95 were sufficiently lubricated during the monitoring period. The computing device 123 may be part of, associated with, an engine controller 122, such as a Full Authority Digital Electronic Control (FADEC) or an Electronic Centralized Aircraft Monitor (ECAM), for example.

The computing device 123 includes processing circuitry 124, memory 125, and a communication interface 126. The memory 125 stores programs that are executed by the processing circuitry 124 for performing the methods described herein. The processing circuitry 124 may comprise a microprocessor and/or an application specific integrated circuit (ASIC), for example. The processing circuitry 124 could include multiple microprocessors or multiple cores or multiple virtual processors. The memory 125 could include any combination of electronic, magnetic, optical or even off-board storage, for example. The communication interface 126 may be an input port to support a wired data connection, or a wireless device to support a wireless connection, for example. Although the computing device 123 is depicted as being part of engine controller 122 in FIG. 3, it is understood that in some embodiments the computing device 123 may be separate from the engine controller 122.

FIG. 5 is a flowchart of an example method 200. A windmilling condition is detected (block 202), and a lubrication pump operational state is detected during the windmilling condition (block 204). A status indicator is commanded (block 206) in response to the windmilling condition and operational state of the lubrication pump detecting steps of blocks 202, 204. In one or more embodiments, detecting the windmilling condition (block 202) includes detecting rotation of first component that corotates with the fan (e.g., gear 88 in FIG. 2). In the same or other embodiments, detecting the lubrication pump operational state (block 204) comprises detecting rotation of a second component that rotates during operation of the lubrication pump (e.g., gear 312).

Figure 6:
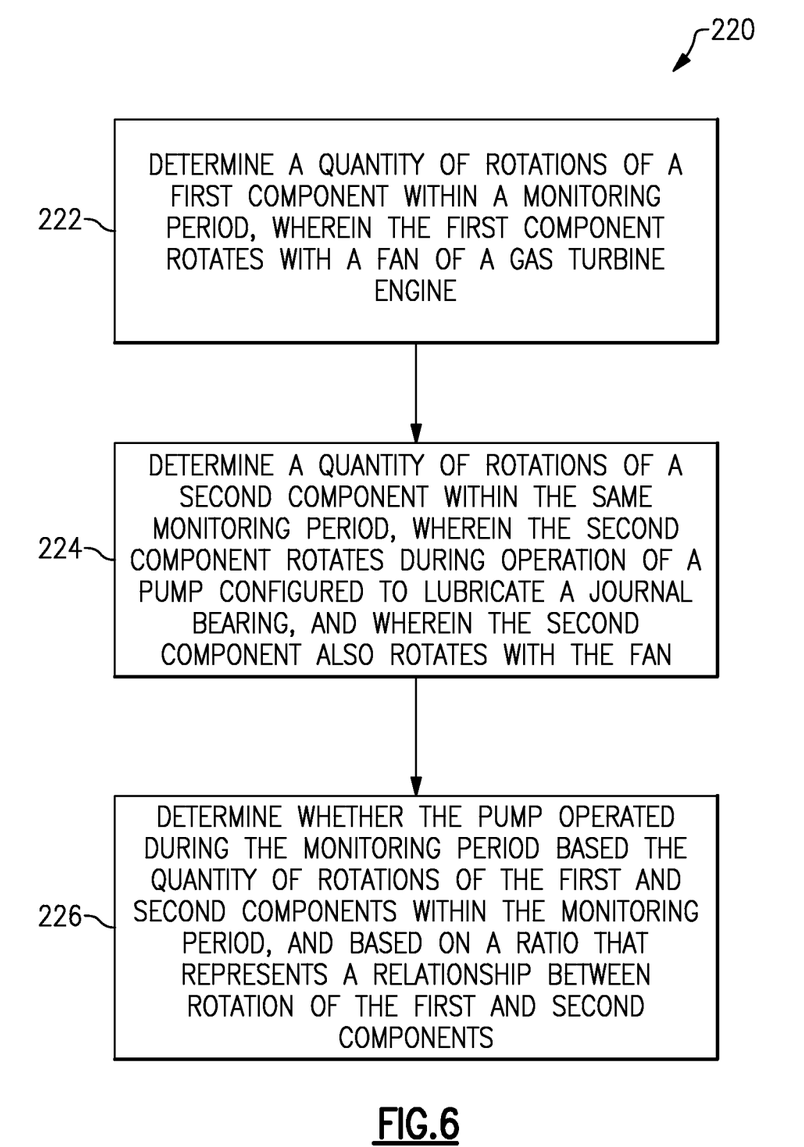
FIG. 6 is a flowchart of an example method of monitoring journal bearing lubrication.

FIG. 6 is a flowchart of a method 220 of monitoring journal bearing lubrication that is implemented by the computing device 123. A determination is made of a quantity of rotations of a first component (e.g., intermediate gear 88) within a monitoring period, wherein the first component corotates with fan 42 of a gas turbine engine 20 (block 222). A determination is also made of a quantity of rotations of a second component (e.g., gear 132) within the same monitoring period, wherein the second component rotates during operation of a pump (e.g., auxiliary lubrication pump 110) configured to lubricate a journal bearing 95, and wherein the second component also rotates with the fan 42 (block 224). A determination is also made of whether the pump operated during the monitoring period based the quantity of rotations of the first and second components, and based on a ratio that represents a relationship between rotation of the first and second components (block 226) (e.g., a gear reduction ratio).

In one or more embodiments, to determine whether the pump operated during the monitoring period (block 226), the computing device 123 is configured to calculate an expected quantity of rotations of the second component based on the ratio and the determined quantity of rotations of the first component, and determine that the pump did not operate for at least a portion of the monitoring period if the expected and determined quantity of rotations of the second component during the monitoring period do not match, within a margin of error (e.g., plus or minus one rotation or a portion of one rotation).

Figure 7:
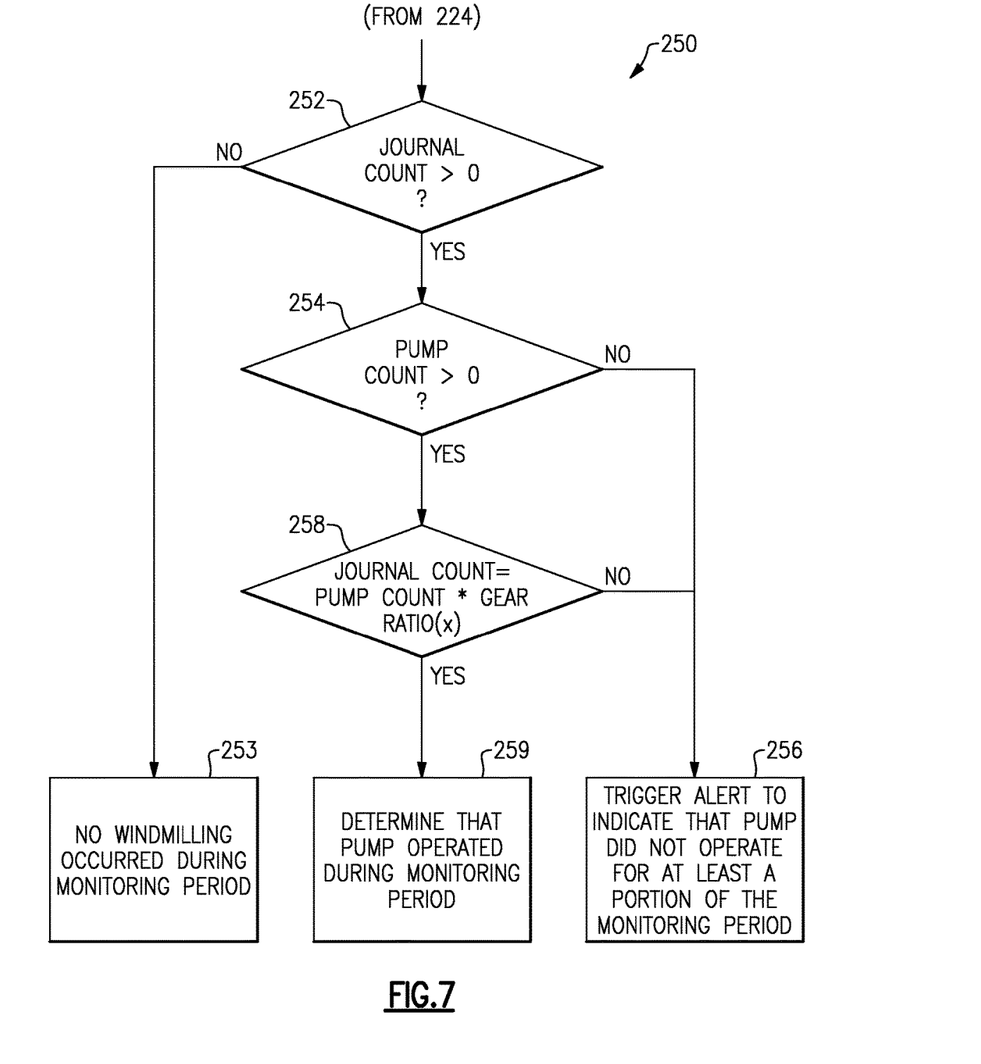
FIG. 7 schematically illustrates an example implementation of the method of FIG. 5.

FIG. 7 illustrates an example implementation 250 of block 226 of FIG. 6. In FIG. 7, "journal count" will refer to a quantity of rotations of a first component during a monitoring period (e.g., rotations of intermediate gear 88 about the journal bearing 95, or rotation of the journal bearing 95 itself), and "pump count" will refer to a quantity of rotations of a second component during the monitoring period (e.g., rotations of second gear 132 about the second axis 133). A determination is made of whether the journal count is greater than zero (block 252). If the journal count is zero, then a determination is made that no windmilling occurred during the monitoring period (block 253).

Otherwise, if the journal count is greater than zero (a "yes" to block 252), then a determination is made of whether the pump count is greater than zero (block 254). If the pump count is not greater than zero (a "no" to block 254), then an alert is triggered to indicate that the pump did not operate for at least a portion of the monitoring period (block 256). If the pump count is greater than zero rotate (a "yes" to block 254), then a determination is made of whether the journal count is equal to the pump count times the gear ratio that represents a relationship between rotation of the first gear 88 and second gear 132, within a margin of error (block 258). If these quantities are equal within the margin of error (a "yes" to block 258), then the determination is made that the pump operated during the monitoring period (block 259). However, if these quantities are not equal (a "no" to block 258), then the alert is triggered (block 256). In one or more embodiments, the triggering of the alert in block 256 comprises turning on a cockpit maintenance light in an aircraft that uses the gas turbine engine 20. Another example alert could include transmitting a message to a pilot, aircraft technician, or other individual (e.g., a wireless transmission of a message).

In one or more embodiments of the method 200, the recording device 120 is powered from a battery (not shown) during the monitoring period, wherein the computing device 120 and gas turbine engine 20 are non-powered during the monitoring period. The battery of the recording device 120 is then charged from an aircraft power source that is different from the battery after the monitoring period, when the computing device 123 and gas turbine engine 20 are powered.

Figure 8:
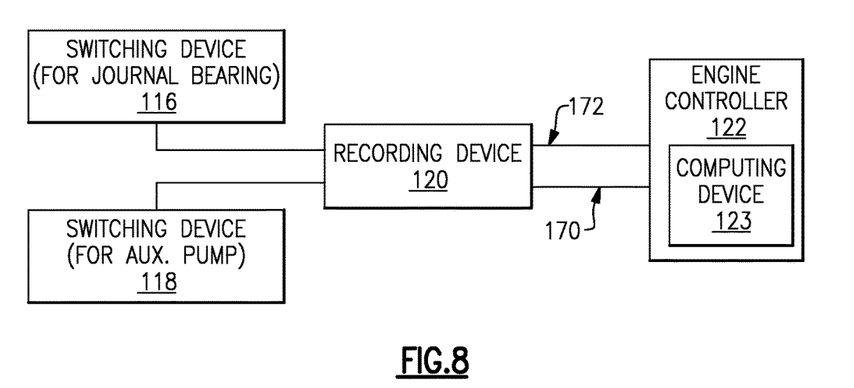
FIG. 8 schematically illustrates a relationship between a journal bearing switching device, a pump switching device, a recording device, and a computing device of an engine controller.

FIG. 8 schematically illustrates a relationship between the switching devices 116, 120, the recording device 120, and computing device 123 of engine controller 122. Each of the journal bearing switching device 116 and auxiliary lubrication pump switching device 118 is in communication with recording device 120. Rotation of intermediate gear 88 causes the switching device 116 to switch an electrical circuit ON or OFF, which causes a state change at the recording device 120. Similarly, rotation of gear 132 causes the switching device 118 to switch an electrical circuit ON or OFF, which causes a state change at the recording device 120. Thus, each switching device 116, 120 notifies the recording device 120 when its corresponding gear rotates. In some embodiments, the electrical circuit that gets switched ON or OFF is a connection between each switch 116, 120 and the recording device, as shown in FIG. 7.

The recording device 120, which may be battery operated, records a quantity of these state changes (e.g., between open and closed) during the monitoring period when the engine controller 122 is off. Upon turning the engine 20, engine controller 122, and computing device 123 on, the data from the recording device 120 can be downloaded over data connection 170 and can be analyzed by computing device 123 of the engine controller 122. In one or more embodiments, the recording device 120 records a time and date of each rotation event, which may be useful in filtering rotation events to a specific monitoring period.

Optionally, the battery that powers the recording device 120 during the monitoring period may charge over a charging connection 172 when the engine controller 122 is turned on. In one or more embodiments, the recording device 120 is a "black box" HOBO® data logger from Onset Computer Corp., as described in U.S. Pat. No. 5,623,416. Those loggers, for example, can store over four million measurements, have a one year battery life, and run on two AA batteries. Of course, it is understood that other devices could be used as the recording device 120.

Figure 9A:
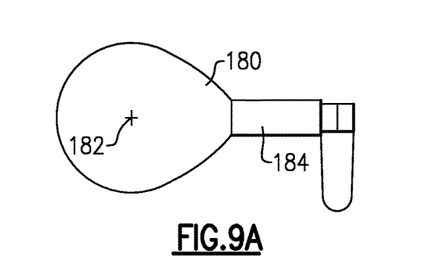
FIGS. 9A-B schematically illustrate example switching devices for detecting gear rotation.
Figure 9B:
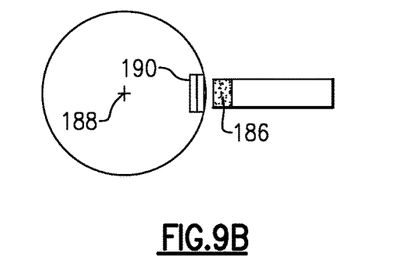

FIGS. 9A-B schematically illustrates example switching devices for detecting gear rotation. FIG. 9A schematically illustrates a cam 180 that corotates with its associated component (e.g., first gear 88 or second gear 132) about its associated axis 182 (e.g., the journal bearing axis 92 or pump axis 131). Once per revolution, the cam 180 actuates a switch 184 to turn a circuit ON or OFF, causing a state change at the recording device 120.

FIG. 9B schematically illustrates a proximity probe 186 that detects when a component 190 passes by the probe 186. The component 190 corotates with its associated component (e.g., the first gear 88 or second gear 132) about its associated axis 188 (e.g., the journal bearing axis 92 or auxiliary lubrication pump axis 131). Once per revolution, the component 190 causes the proximity probe 186 to switch an electrical circuit ON or OFF, causing a state change at the recording device 120.

In some embodiments, one or both of the switching devices 116, 118 are cam switches (e.g., as shown in FIG. 8A). In some embodiments, one or both of the switching devices 116, 118 are proximity probe sensors (e.g., as shown in FIG. 8B). In other embodiments, a combination of cam switches and proximity probes are used.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A lubrication monitoring system comprising:
   a fan;
   a gear reduction operatively coupled to the fan;
   a lubrication pump operatively coupled to the fan and in fluid communication with the gear reduction;
   a first sensor configured to detect a windmilling condition of the fan, and a second sensor configured to detect an operational state of the lubrication pump; and
   a controller in communication with the first and second sensors and configured to:
     monitor the windmilling condition and the operational state of the lubrication pump;
     determine, based on the windmilling condition and the operational state of the lubrication pump, whether the lubrication pump operated during the windmilling condition; and
     command a status indicator in response to the windmilling condition and operational state of the lubrication pump, the status indicator indicating whether the lubrication pump operated during the windmilling condition.

2. The lubrication monitoring system of claim 1:
   wherein to detect the windmilling condition of the fan, the first sensor is configured to detect rotation of a first component that corotates with the fan; and
   wherein to detect the operational state of the lubrication pump, the second sensor is configured to detect rotation of a second component that corotates with the fan during operation of the lubrication pump.

3. The lubrication monitoring system of claim 2, wherein the first component is part of the gear reduction.

4. The lubrication monitoring system of claim 2, wherein the first component is a journal bearing.

5. The lubrication monitoring system of claim 2, wherein at least one of the first and second sensors comprises a proximity probe configured to detect rotation.

6. The lubrication monitoring system of claim 2, wherein at least one of the first and second sensors is actuated by a cam that corotates with the associated component of said at least one of the first and second sensors.

7. The lubrication monitoring system of claim 1, wherein the lubrication pump is mechanically coupled to the gear reduction, and wherein rotation of a fan shaft drives operation of the lubrication pump.

8. The lubrication monitoring system of claim 1:
wherein the lubrication monitoring system is part of a gas turbine engine; and
wherein the lubrication pump is an auxiliary lubrication pump that is configured as a backup for a main lubrication pump.

9. A lubrication monitoring system comprising:
a fan;
a gear reduction operatively coupled to the fan;
a lubrication pump operatively coupled to the fan and in fluid communication with the gear reduction;
a first sensor configured to detect a windmilling condition of the fan by detecting rotation of a first component that corotates with the fan;
a second sensor configured to detect an operational state of the lubrication pump by detecting rotation of a second component that corotates with the fan during operation of the lubrication pump; and
a controller in communication with the first and second sensors and configured to:
monitor the windmilling condition and the operational state of the lubrication pump, and command a status indicator in response thereto;
calculate a predicted quantity of rotations of the second component based on a determined quantity of rotations of the first component and a ratio that represents a relationship between rotation of the first and second components; and
determine that the lubrication pump did not operate for at least a portion of the windmilling condition if the predicted quantity of rotations of the second component does not match an actual quantity of rotations of the second component during the windmilling condition, within a margin of error.

10. A lubrication monitoring system comprising:
a fan;
a gear reduction operatively coupled to the fan;
a lubrication pump operatively coupled to the fan and in fluid communication with the gear reduction;
a first sensor configured to detect a windmilling condition of the fan, and a second sensor configured to detect an operational state of the lubrication pump; and
a controller in communication with the first and second sensors and configured to monitor the windmilling condition and the operational state of the lubrication pump, and command a status indicator in response thereto;
wherein the controller comprises:
a battery-operated recording device configured to record data from the first and second sensors; and
a computing device that is discrete from but operatively connected to the recording device, and configured to: download the data from the recording device, and determine, based on the windmilling condition and the operational state of the lubrication pump indicated by the data, whether the lubrication pump operated during the windmilling condition.

11. The lubrication monitoring system of claim 10, wherein the computing device comprises one of a Full Authority Digital Electronic Control (FADEC) and an Electronic Centralized Aircraft Monitor (ECAM).

12. The lubrication monitoring system of claim 10, wherein the computing device is non-powered during the windmilling condition, and wherein the computing device is configured to charge the battery of the recording device when the computing device is powered.

* * * * *